United States Patent
Rankin (10) Patent No.: US 10,908,133 B2
(45) Date of Patent: Feb. 2, 2021

(54) SYSTEM AND METHOD FOR DETECTING HIDDEN CHEMICALS WITHIN OBJECTS IN A NON-INVASIVE MANNER

(71) Applicant: John Rankin, Columbus, OH (US)

(72) Inventor: John Rankin, Columbus, OH (US)

(73) Assignee: Rankin Labs, LLC, Williamsport, OH (US)

(*) Notice: Subject to any disclaimer, the term of this patent is extended or adjusted under 35 U.S.C. 154(b) by 0 days.

(21) Appl. No.: 16/850,165

(22) Filed: Apr. 16, 2020

(65) Prior Publication Data

US 2020/0333298 A1 Oct. 22, 2020

Related U.S. Application Data

(60) Provisional application No. 62/834,996, filed on Apr. 17, 2019.

(51) Int. Cl.
G01N 29/07 (2006.01)
G01N 29/44 (2006.01)

(52) U.S. Cl.
CPC ......... *G01N 29/4436* (2013.01); *G01N 29/07* (2013.01); *G01N 2291/011* (2013.01); *G01N 2291/024* (2013.01)

(58) Field of Classification Search
CPC .............. G01N 29/4436; G01N 2291/024
See application file for complete search history.

(56) References Cited

U.S. PATENT DOCUMENTS

| | | | |
|---|---|---|---|
| 3,688,090 A | 8/1972 | Rankin | |
| 5,473,934 A | 12/1995 | Cobb | |
| 6,023,724 A | 2/2000 | Bhatia et al. | |
| 6,065,328 A | 5/2000 | Dayton et al. | |
| 6,359,597 B2* | 3/2002 | Haj-Yousef | G01V 3/12 343/850 |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |
| 7,188,513 B2* | 3/2007 | Wilson | G01N 1/2226 73/31.01 |
| 7,246,522 B1* | 7/2007 | Diaz | G01N 29/07 73/52 |

(Continued)

OTHER PUBLICATIONS

A Simulation Algorithm Capable of Modelling Spatial Impact Points From the Neutralization of an Improvised Explosive Device, Computer Science, Ryerson University 2013 (Year: 2015).*

(Continued)

*Primary Examiner* — Jacques M Saint Surin
(74) *Attorney, Agent, or Firm* — Standley Law Group LLP; Adam J. Smith; Jeffrey S. Standley (57) ABSTRACT

Systems and methods are disclosed for non-invasive detection of chemicals within objects. An object comprised of cellulose material is placed inside an examination chamber, which is sealed. A first measurement of the speed of sound waves traveling through the chamber is taken to establish a baseline. The chamber is heated to liberate any stored chemicals within the object and a second measurement is taken. An expected difference is compared to an actual difference in measurements to determine if hidden chemicals are present.

20 Claims, 2 Drawing Sheets

(56) References Cited

U.S. PATENT DOCUMENTS

| | | | |
|---|---|---|---|
| 7,417,440 B2* | 8/2008 | Peschmann | G01V 5/0016 250/250 |
| 8,220,312 B2* | 7/2012 | Nacson | G01N 1/2214 73/31.01 |
| 8,371,169 B1* | 2/2013 | Masyada | G01N 29/045 73/579 |
| 8,374,091 B2 | 2/2013 | Chiang | |
| 8,397,151 B2 | 3/2013 | Salgado et al. | |
| 9,350,663 B2 | 5/2016 | Rankin | |
| 2001/0017844 A1 | 8/2001 | Mangin | |
| 2001/0019614 A1 | 9/2001 | Madoukh | |
| 2002/0041592 A1 | 4/2002 | Van Der Zee et al. | |
| 2002/0054570 A1 | 5/2002 | Takeda | |
| 2002/0071436 A1 | 6/2002 | Border et al. | |
| 2003/0031198 A1 | 2/2003 | Currivan et al. | |
| 2004/0093948 A1 | 5/2004 | Kelner et al. | |
| 2005/0286517 A1 | 12/2005 | Babbar et al. | |
| 2006/0002681 A1 | 1/2006 | Spilo et al. | |
| 2006/0034317 A1 | 2/2006 | Hong et al. | |
| 2006/0133364 A1 | 6/2006 | Venkatsubra | |
| 2006/0259587 A1 | 11/2006 | Ackerman et al. | |
| 2007/0028121 A1 | 2/2007 | Hsieh | |
| 2007/0223395 A1 | 9/2007 | Lee et al. | |
| 2010/0103830 A1 | 4/2010 | Salgado et al. | |
| 2011/0149891 A1 | 6/2011 | Ramakrishna | |
| 2012/0289250 A1 | 11/2012 | Fix et al. | |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |
| 2013/0091102 A1 | 4/2013 | Nayak | |
| 2014/0100014 A1 | 4/2014 | Bennett, III et al. | |
| 2014/0254598 A1 | 9/2014 | Jha et al. | |
| 2014/0294019 A1 | 10/2014 | Quan et al. | |
| 2015/0100613 A1 | 4/2015 | Osiecki et al. | |
| 2015/0229714 A1 | 8/2015 | Venkatsubra et al. | |
| 2016/0171399 A1 | 6/2016 | Santhanam et al. | |
| 2016/0269294 A1 | 9/2016 | Rankin | |
| 2017/0090872 A1 | 3/2017 | Mathew | |
| 2018/0018147 A1 | 1/2018 | Sugawara | |
| 2018/0102975 A1 | 4/2018 | Rankin | |

OTHER PUBLICATIONS

Port Security: Container Cargo Control, V. Valkovic, D. Sudac, D. Matika, Promet-Traffic&Transportation, vol. 18, 2006, No. 3, 235-244 235 (Year: 2006).*

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

* cited by examiner

SYSTEM AND METHOD FOR DETECTING HIDDEN CHEMICALS WITHIN OBJECTS IN A NON-INVASIVE MANNER

CROSS-REFERENCE TO RELATED APPLICATIONS

This application claims the benefit of U.S. Provisional Application No. 62/834,996 filed Apr. 17, 2019, the disclosures of which are hereby incorporated by reference as if fully rested.

TECHNICAL FIELD

Exemplary embodiments of the present invention relate generally to systems and methods for non-invasive detection of chemicals hidden within objects.

BACKGROUND AND SUMMARY OF THE INVENTION

There is a serious need for detecting and/or identifying hidden chemicals within objects, such as but not limited to, sealed packages, letters, or containers. This serious need is wide spread and has a great number of important applications for security and public safety. While the disclosures provided herein are applicable to a large variety of security concerns, for purposes of illustration examples are provide herein, without limitation, with respect to the inmate mail processing of the U.S. Federal Prison System as a representative sample of these wider problems.

Prisons in the Federal System are grappling with the flood of the chemical substitutes for marijuana. These substitutes are sometimes referred to as "K2", however, the formula for actual K2 has long been retired by many criminal enterprises. Hereinafter K2 may be used to generally refer to marijuana substitutes. An almost inexhaustible variety of chemical modifications have taken the place of traditional marijuana. This is mostly due to the ever-changing legal landscape, as well as the poor testing available for these drugs. Inmates confined to prisons and jails have become a significant market for the sale of these substitutes for several reasons: first is the ease and availability of outside suppliers prepared to propagate the drug within the prisons; second is the ease of concealment and consumption by adding the materials to tobacco products; third is the lack of testing available for detecting such drug use by the inmate population; and fourth is the innocuous appearance of the product and its ease of delivery through the mail processing centers of the confinement facilities.

K2 is easily purchased at retail shops dedicated to selling marijuana paraphernalia. It is often legal due to the continual adjustment of the formula, which often remains slightly ahead of any attempt to legislatively regulate and control it. Law enforcement is most often unaware of the specific chemical makeup or delivery methods of K2, which tends to allow relatively free sale and distribution. Once the legal system adjusts, the formula is often changed to avoid legal involvement with the sale. The product itself is generally provided to the customer in a container that lends itself to atomization. Street application often involves spraying the K2 directly onto a tobacco product and intaking the drug via smoking. Distribution to inmate populations, however, is often accomplished using an indirect distribution.

For example, the liquid form of K2 may be sprayed, or otherwise soaked, into the cotton fibers of a cotton paper. The paper is often a standard 8½ by 11 sheet of paper and can contain writing so as to appear innocuous. Once the paper has dried, it is distributed to inmates through the mail and appears to look like any other document.

Once the inmate has received a sheet of paper that has been saturated with K2 and then dried, the paper may be cut into small pieces, inserted into a tobacco product, and smoked to ingest the marijuana substitute. Since the formula is continually changing, the specific tests for K2 are both impractical and expensive. Furthermore, once an inmate has received the K2 infused paper, its detection is highly unlikely and, therefore, frustrating to prison personnel.

Since handling of this chemical compound is sometimes legal outside of prisons and jails, and possession of the substance is largely undetectable in the hands of inmates, the most practical way to control the distribution of K2 is to focus upon its entry to the facility, which generally occurs through the mail. However, mailroom personnel are most often uneducated concerning this product. Facilities for incarceration tend to deploy officers with greater skills and education in roles outside of the mailroom and thus, this all-important conduit becomes more vulnerable to criminal activity.

A common approach for successfully smuggling K2 is to spray the K2 onto a legal brief, allow the now K2 soaked papers to dry, and then send the papers through the mailroom as legal mail. In the Federal System there are established protocols that attempt to protect attorney client privilege. While birthday or other cards are also a favorite vehicle, the legal mail approach typically affords the greatest volume of marketable drug and chemical product. The length of some legal briefs run into the hundreds of pages and therefore twenty to fifty pages of K2 can easily be included in the package. Often, criminal enterprises utilize either discarded or unconnected legal contacts to avoid detection of suspicious legal packages. However, mailroom personnel are usually under staffed and far too under paid to perform the simple checks necessary to uncover such obvious deceptions. Therefore, a need exists for non-invasive detection of chemicals which might be hidden in objects. What is needed is a system and method for the non-invasive detection of chemicals within objects, such as but not limited to, packages, letters, or containers. These disclosures provide systems and methods for the non-invasive identification and detection of chemicals within objects, such as but not limited to, packages, letters, and containers. Once an object is identified as possibly containing certain chemicals, the object may be carefully inspected for possible contraband. In exemplary embodiments, the disclosed systems and methods may also permit for identification of the hidden chemicals. If it can be scientifically shown that the object contains hidden chemical substances in general, and/or certain chemical substances found in contraband, justification, such as but not limited to probable cause, may be established for possible search, seizure, and/or other investigatory and/or enforcement efforts. Particularly for, but not limited to, the inspection of legal correspondence within the prison system, such non-invasive techniques may provide the requisite justification for the further investigatory and/or enforcement efforts while respecting the potential attorney client privilege issues. Once a sufficiently definitive observation of hidden chemicals and/or certain chemicals, such as but not limited to contraband substances or those commonly found in contraband, can be shown, the safety of the facility may rise above the privacy concerns.

Sound Waves

Sound generally propagates through a homogenized or heterogenic volume of gaseous or liquid materials. The movement of such sound waves may be detected through changes in pressure on adjacent molecular structures. These materials may exert an equivalent pressure upon adjacent materials, and therefore pass the exertion of pressure forward in the direction of the sound wave. The speed with which the materials propagate the sound pressure is dependent upon the kinetic energy with which the material is vibrating. As material vibrations are affected by temperature, the temperature of the material directly relates to the speed with which the pressure is propagated.

As temperature within a volume of material may vary, it is also true that sound may propagate with varying speed. Further, a wave traveling in a specific direction moves at a varying speed. The speed of the overall propagation divided by the total distance traveled will yield the average speed of sound through the area. Therefore, and because sound waves travel at a speed that is dependent upon the temperature of the material they are traveling through, the average temperature of the area can be determined by the average speed which the sound propagates through a given area.

The speed of sound is affected by a number of controllable and measurable elements. Several examples of such elements are provided herein for example and without limitation. The numbers and measurements provided may be estimates and are not intended to be limiting.

1. The type of gas through which sound waves propagate has a significant effect upon speed. For example, at 27° C., sound propagates at approximately 1310 meters per second in hydrogen. However, the propagate speed decreases to approximately 450 meters per second when the gas is methane. For dry air, at 25° C., the speed of sound is approximately 346 meters per second. However, a number of other factors may also contribute to the speed at which sound waves pass through various materials, such as those factors discussed below.

2. The speed of sound generally increases when the propagation medium is a liquid. However, the temperature of the liquid remains a factor. For example, the speed of sound in water at 25° C. is approximately 1497 meters per second, which is significantly faster than dry air.

3. The speed of sound propagation through solid materials is also influenced by temperature; however, there is a significant difference in the speed relative to the angle of the wave motion. For example, steel propagates sound at approximately 5940 meters per second when the wave is longitudinal (parallel with the surface) but decreases to approximately 3220 meters per second when it is a shear wave.

4. The frequency of sound has relatively small influence upon the speed in normal air. For example, a low frequency of 20 Hz travels at approximately 343.477 meters per second at 20° C. and 0% humidity. When the frequency is increased to 80,000 Hz the speed only slightly increases to approximately 343.567 meters per second.

5. Humidity has an effect on the speed of sound only slightly greater than frequency. For example, an 80 kHz wave at 20° C. travels at approximately 343.567 meters per second, as noted above. When the humidity is increased to 100% the speed increases to approximately 344.742 meters per second.

6. Atmospheric pressure has only a slightly varying effect upon the speed of sound in dry air. At two atmospheres, which is twice the standard atmospheric pressure at sea level, and −100° C. the speed decreases by approximately 0.13%, while at 80° C. the speed increases by approximately 0.04%.

7. Temperature offers a profound change in air, as the propagation varies significantly. For example, a measurement of the speed of sound in dry air yields approximately 263.5 meters per second at −100° C., and approximately 376.7 meters per second at 80° C. Thus, there is a significant change in speed due to temperature.

The formula for calculating the speed of sound in air is generally modeled as: 331.3+(0.606×C) meters per second. Where C is equal to the temperature in degrees Celsius. The resulting value must generally be adjusted slightly for humidity, frequency, and atmospheric pressure. These adjustments, however, result in relatively small changes as compared to the resulting change in speed due to a change in temperature.

The reason why the speed of sound is so significantly affected by a change in temperature, for a gas rather than other mediums, is discussed in the work of French Physicist Jacques Alexandre Charles (1746-1823), John Dalton (1766-1844), and Joseph Louis Gay-Lussac (1778-1850), for example. These men determined that gases expand by the same fractional amount for the same rise in temperature. This expansion was determined to be an expansion of $\frac{1}{273}$ of their volume at 0° C. for each degree Centigrade that the gas is heated. Since sound propagates by presenting pressure against a molecule, the pressure subsequently presses against the adjacent molecule, a $\frac{1}{273}$ expansion of the size of the molecule will change the propagation. In other words, as the gas is heated, there is an expansion of the gas molecules, therefore there are fewer molecules between the origination and the termination of the wave.

Paper as a Medium for Transporting Dried Chemicals

Paper with a high cotton fiber content is one type of vehicle used to store and transport chemicals. The paper, ink, and toner that make up the transportation medium are generally composed of a highly condensed cellulose material. Material which, by design, is resistant to evaporation and natural deterioration. Liquified chemicals that are absorbed by the cellulose generally have loose connections to the cellulose and are vulnerable to evaporation and detachment. Liquids that have been absorbed into the cellulose differ from chemicals in a solid state. Rather than being a possibly crystalized solid, these liquid chemicals are fragilely held by the cellulose and can easily be dislodged and become gaseous.

This paper-soaked method of transport also provides a convenient method for chemical ingestion. However, if chemical bonding has occurred, it may change the chemical composition of the embedded material, and thus affect the effect of any such absorbed substance on a human recipient. Chemicals dried in a paper pulp cellulose may maintain their independence and can be easily liberated from the material.

Chemicals held loosely with a cellulose are typically in a state of deterioration and evaporation as can be observed by their odor. Detachment of chemicals held in a cellulose material can be accelerated by the introduction of heat. It is possible to detach a certain amount of chemical materials through an application of gentle heat that causes little to no damage to the transportation cellulose. Stated another way, the application of heat in a controlled fashion will cause little to no damage to any printed papers on which such substances may be applied. Furthermore, the release of additional gaseous content, via the application of heat, may change the speed with which sounds propagate through the surrounding volume. So long as the transportation cellulose is contained within a gaseous container, the liberated chemicals will expand to fill all the available space, and thus, be detectable by a change in the speed of sound within the container.

Sensitivity of Sound as Observer.

Sound moves through homogenized or heterogenic gaseous, solid, or liquid materials at different speeds depending upon the temperature, pressure, humidity, distance, and composition of the molecules through which the sound wave must propagate, for example. By placing an object within a gaseous sealed container, it is possible to control for temperature, pressure, humidity, and distance. Once these variables have been accounted for, a careful measurement of the speed of a sound wave within the container may determine the average composition of any objects contained therein. By changing the value of heat or temperature, the liberation of any concealed chemicals may be observed. With a careful and accurate measurement of the speed of sound within the container, the change in gaseous materials may be detected. The speed of sound is highly sensitive to the mixture of gas. For example, at 27° Celsius, the speed of sound is: approximately 323 m/sec for Argon, 312 m/sec for Ethane, 331 m/sec for Ethylene, 1310 m/sec for Hydrogen, 45 m/sec for Methane, and 330 m/sec for Oxygen.

The application of heat may liberate chemicals absorbed within the paper cellulose such that the presence of absorbed chemicals within the confined container may be determined by the speed of sound propagation.

The accuracy and sensitivity of this observation may permit exceedingly fast identification of certain chemicals, such as but not limited to contraband, without performing an invasive operation. Depending upon the material used for the object, the liberated chemical materials will either be present within the air space of the object or pass through porous layers of the object to be present within the volume of the container. For example, without limitation, sound waves may be propagated and measured within an enclosure containing the object (e.g., package, letter, or container) with high levels of sensitivity and accuracy to detect the presence of such liberated chemicals.

This hidden chemical detection process for paper or other similar cellulose material may be achieved without opening the object (e.g., package, letter, or container) that is being used to transport the hidden chemicals. By using a non-invasive method of observation, detection, and/or identification, objects that contain hidden chemicals may be isolated for more careful scrutiny and potential probable cause may be developed for further identification and/or enforcement efforts such as, but not limited to, search and seizure.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
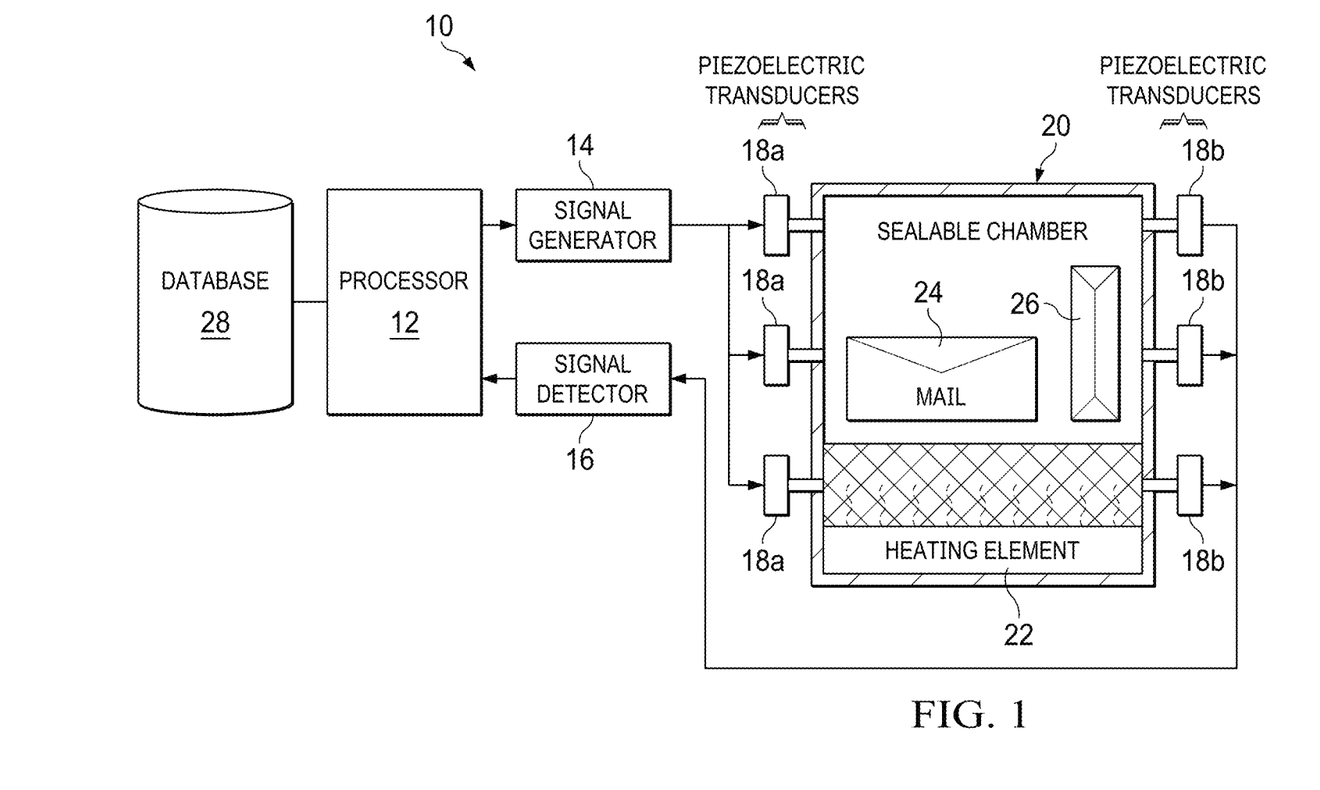
FIG. 1 is a simplified block diagram illustrating an exemplary detection device.

FIG. 1 illustrates an exemplary detection device 10. The detection device 10 may comprise a processor 12. The processor 12 may be in electrical connection with one or more ultrasonic signal generators 14. The processor 12 may be in electrical connection with one or more ultrasonic signal detectors 16. While certain discussion is provided herein with respect to ultrasonic sound waves, other type of sound waves, such as but not limited to those audible to the human ear, may be utilized as an alternative to, or in addition to, the ultrasonic signal generators and detectors 14 and 16.

The detection device 10 may comprise an examination chamber 20. The processor 12 may be in electrical connection with one or more signal producing piezoelectric transducers 18*a*. The processor 12 may be in electrical connection with one or more signal detecting piezoelectric transducers 18*b*. The signal producing piezoelectric transducers 18*a* may be positioned on a first side of an examination chamber 20. The signal detecting piezoelectric transducers 18*b* may be positioned on a second side of an examination chamber 20 opposing the first side, though any arrangement of the signal producing and detecting piezoelectric transducers 18*a* and 18*b* may be utilized.

The detection device 10 may be configured to selectively provide a gaseous seal within the examination chamber 20 such that the examination chamber 20 may selectively be made substantially air tight. Such a seal may be provided by way of one or more gaskets, airlocks, air impermeable barriers, vacuum pumps, some combination thereof, or the like. The examination chamber 20 may be large enough to hold various objects 24, such as but not limited to packages, letters, or containers, for examination. The examination chamber 20 may comprise one or more heating elements 22. The heating elements 22 may be in electronic communication with, and controlled by, the processor 12 such that the examination chamber 20 may be carefully and accurately heated. The heating elements 22 may comprise any type of heating device. Any size and/or shape examination chamber 20 may be utilized. The detection device 10 may comprise more than one examination chamber 20 and related components. The heating element 22 may be located within, adjacent to, or otherwise in fluid communication with the examination chamber 20. Each examination chamber 20 may be sized to accommodate a single, or multiple, objects 24.

The processor 12 may be in electronic communication with one or more databases 28. The databases 28 may comprise various preprogrammed characteristics of air, such as but not limited to, the speed of sound through air of various compositions, temperatures, pressures, humidity, and the like. The database 28 may comprise any number and kind of electronic storage device. The database 28 may further comprise executable software instructions, which when executed, configure the processor 12 to perform any number of the functions described herein. In exemplary embodiments, the detection device 10 may comprise one or more housings which may be provided for the database 28, the processor 12, the signal generator 14, the signal detector 16, and/or the examination chamber 20 and other components of the detection device 10.

The examination chamber 20 may comprise one or more sensors 26 capable of determining the temperature, humidity, and/or pressure of air within the examination chamber 20. These sensors 26 may be located within a single unit or in separate units. More than one of each type of sensor 26 may be used. The one or more sensors 26 may be in electronic communication with the processor 12. The sensors 26 may be located within, adjacent to, or otherwise in fluid communication with the examination chamber 20. Alternatively, or additionally, the air characteristic data otherwise provided by the sensors 26 may be pre-programmed or provided by manual input.

The signal producing and signal detecting piezoelectric transducers 18a and 18b may be comprised of a crystal, such as quartz, which may convert electrical oscillations into mechanical vibrations (for example, signal producing piezoelectric transducers 18a) and mechanical vibrations into electrical oscillations (for example, signal detecting piezoelectric transducers 18b). These piezoelectric crystals may be formed into a shape that provides a large variety of ultrasonic beam properties, such as a focused beam. The use of crystals is merely exemplary and not intended to be limiting. Any type of signal transducer 18a and/or detector 18b may be utilized.

Figure 2:
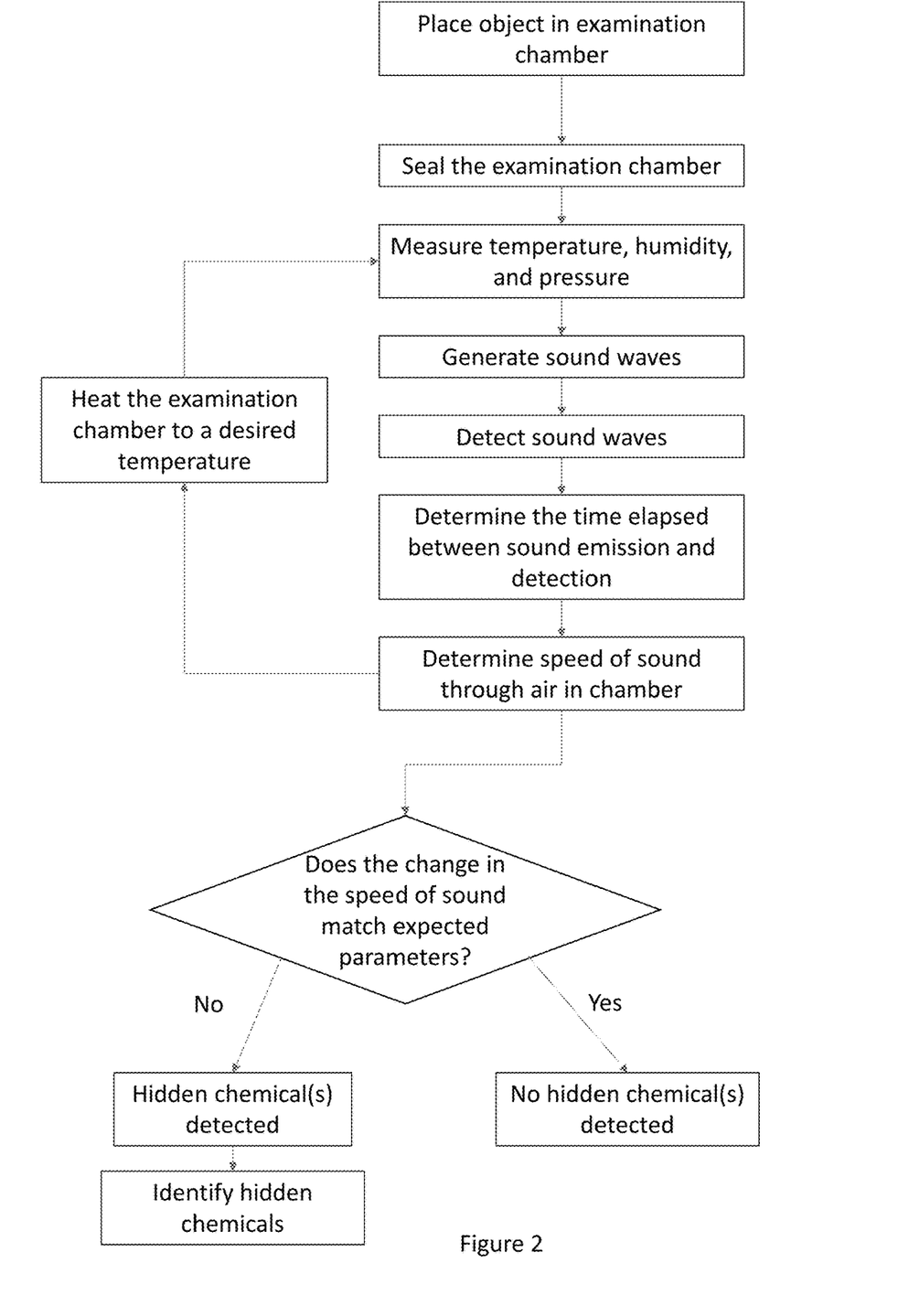
FIG. 2 is a flow chart illustrating exemplary logic for use with the detection device of FIG. 1.

FIG. 2 is a flow chart illustrating exemplary logic for use with the detection device 10 of FIG. 1. The operation of the detection device 10 may follow a number of steps to detect the presence of chemicals within the objects 24 tested. The steps provided herein are provided without limitation. In exemplary embodiments, certain steps may be omitted, repeated, and performed in any order.

Various objects 24 for examination may be placed within the examination chamber 20. The examination chamber 20 may be sealed so that substantially no gaseous content can escape. An electrical oscillation at the signal generating piezoelectric transducers 18a may be generated to create an ultrasonic sound wave, or array of sound waves, and broadcast the sound wave within the examination chamber 20. The frequency of such a wave, or waves, may exceed 150 KHz in exemplary embodiments, without limitation, in order to avoid falling into a frequency which can be heard by animals, though any frequency may be utilized.

The temperature, humidity, and/or pressure may be measured by the one or more sensors 26. The distance between the signal producing piezoelectric transducers 18a and the signal detecting piezoelectric transducers 18b may be a known and predetermined value. In other embodiments, this distance may be measured and inputted.

The time the signal producing piezoelectric transducers 18a emit one or more sound waves may be recorded. The time may be recorded at the processor 12, which may comprise, or be in electronic communication with, a time keeping device. The signal detecting piezoelectric transducers 18b may monitor for detected sounds. When the emitted sound wave strikes the signal detecting piezoelectric transducer 18b positioned on the opposite side of the examination chamber 20, the time may be recorded. The time may be recorded at the processor 12. The speed of sound may be measured as the difference between the time the sound was emitted from the signal generating piezoelectric transducers 18a and the time the sound was detected at the signal detecting piezoelectric transducers 18b. This determination may be performed at the processor 12, though such is not required.

The examination chamber 20 may be heated to a known amount by the one or more heating elements 22 as measured by the sensor 26. The sensor 26 may take periodic temperature readings and the heating elements 22 may be adjusted accordingly. In other exemplary embodiments, the object 24 may be exposed to sound waves from the signal generating piezoelectric transducers 18a. The sound waves may be configured to provide vibrations which heat the examination chamber 20 to liberate stored chemicals within the object 24. Such sound waves may be used in addition to, or alternatively to, the heating elements 22.

A second sound wave or group of sound waves may be generated and detected. The time the signal producing piezoelectric transducers 18a emit the second sound waves may be recorded. The time may be recorded at the processor 12. The signal detecting piezoelectric transducers 18b may monitor for detected sounds. When the emitted second sound waves strike the signal detecting piezoelectric transducer 18b positioned on the opposite side of the examination chamber 20, the time may be recorded. The time may be recorded at the processor 12. This second speed of sound may be measured as the difference between the time the second sound was emitted from the signal generating piezoelectric transducers 18a and the time the second sound was detected at the signal detecting piezoelectric transducers 18b. This determination may be performed at the processor 12, though such is not required.

The examination chamber 20 may be subsequently heated and additional sound measurements may be taken as desired.

A comparison of the at least two collected speeds may be performed to determine whether the difference between the two collected speeds matches the anticipated change in speed. If there is a sufficient change in the expected speed of sound from the measured speed of sound, it may be determined that there are hidden chemicals stored within the cellulose of the objects 24 being tested. The processor 12 may be configured to provide a degree of certainty output. In other exemplary embodiments, if the difference is greater than a predetermined amount, and therefore presumably due to a change in chemical composition, the processor 12 may determine that hidden chemicals are present. If the difference is less than a predetermined amount, and therefore presumably due to error or other normal variation, the processor 12 may determine that hidden chemicals are not present.

Stated another way, if there are no absorbed chemicals stored in the cellulose of the enclosed objects 24, then there will be no change to the chemical composition of the air surrounding and within the objects 24 as well as in the examination chamber 20 more generally when heat is applied. However, if there are hidden chemicals stored in the cellulose of the enclosed objects 24, then the heating process will likely liberate at least some quantity of these chemicals and change the composition of the air. This change in air composition will affect the speed at which sound travels through the air. Thus, the presence of hidden chemicals may be determined.

This detection device 10 may operate accurately and produce reliable results. The presentation of the statistical variance from the expected result may be sufficient to establish justification, such as but not limited to probable cause, for a more invasive inspection. Furthermore, in exemplary embodiments, any of the measurements, including but not limited to, the difference in the speeds, may be compared against a table of known tested samples to determine the likely composition of the hidden chemical(s) within the tested objects 24. In exemplary embodiments, such a comparison may be made electronically at the processor 12 by way of data stored in the database 28 in connection with the processor 12.

The results of the testing, such as but not limited to a determination regarding the presence or non-presence of hidden chemicals, may be displayed at an electronic display associated with the testing device 10, transmitted to one or more remote electronic devices, some combination thereof, or the like.

Given the high levels of sensitivity with which sound waves react to their passage through different materials and gases, the results of the aforementioned examination will be extremely accurate. Furthermore, because the objective of the persons hiding the chemicals is to appear natural and innocuous, there will often be ample air space between layers and around packaging for liberated chemicals to be detected.

The electrical connections described herein may be wired or wireless.

While the disclosures provided herein are applicable to a large variety of security concerns, for purposes of illustration examples are provide herein, without limitation, with respect to the inmate mail processing of the U.S. Federal Prison System as a representative sample of these wider problems. It is contemplated that the disclosed system and method may be utilized in any security context. For example, without limitation, US Postal Service, private mail services, security checkpoints (e.g., harbors, borders, airports and other public transportation terminals, and the like), security or safety zones (e.g., sporting events, concerts, military installations, stadiums, arenas, and the like), individual mail screening (e.g., for VIPs, politicians, celebrities, individuals, organizations, and the like), and the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for non-invasive examination of an object comprised of cellulose material, said method comprising the steps of:
   placing the object inside an examination chamber;
   sealing the examination chamber to enclose the object;
   taking a first temperature measurement of the examination chamber;
   taking a first measurement of the speed of sound waves traveling through the examination chamber, including through the object, to establish a baseline;
   heating the examination chamber to release chemicals stored within the cellulose material of the object;
   taking a second temperature measurement of the examination chamber;
   taking a second measurement of the speed of sound waves traveling through the examination chamber, including through the object, to establish a second measurement;
   determining an expected difference between the baseline and the second measurement, wherein the expected difference reflects the difference in the speed of sound at the first temperature and the second temperature;
   comparing the baseline with the second measurement to determine an actual difference; and
   comparing the actual difference to the expected difference.

2. The method of claim 1 wherein:
   the steps of taking the first and second measurements of the speed of sound waves comprises the sub-steps of:
      generating sound waves at a first number of piezoelectric transducers located along a first wall of the examination chamber; and
      detecting the generated sound waves at a second number of piezoelectric transducers located along a second wall of the examination chamber, where said first wall opposes said second wall.

3. The method of claim 2 wherein:
   the first and second temperature measurements are taken by a sensor located within or in fluid communication with the examination chamber;
   the baseline and the second measurement are determined by a processor in electronic communication with the first and second number of piezoelectric transducers; and
   the expected difference and the actual difference are determined at the processor.

4. The method of claim 3 further comprising the steps of:
   determining that the actual difference is greater than the expected difference by at least a predetermined amount; and
   determining that hidden chemicals are present within the object.

5. The method of claim 4 further comprising the steps of:
displaying, at an electronic display associated with the examination chamber, a message indicating that hidden chemicals are detected.

6. The method of claim 4 further comprising the steps of:
transmitting a message indicating that hidden chemicals are detected to one or more electronic devices associated with the examination chamber.

7. The method of claim 3 further comprising the steps of:
determining that the actual difference is greater or less than the expected difference by less than a predetermined amount; and
determining that no hidden chemicals are present within the object.

8. The method in claim 3 further comprising the steps of:
comparing, at the processor, the actual difference with a table of known values collected from known samples and stored at an electronic database to identify a composition of the hidden chemicals.

9. The method in claim 3 further comprising the steps of:
comparing, at the processor, the second measurement with a table of known values collected from known samples and stored at an electronic database to identify a composition of the hidden chemicals.

10. The method of claim 3 wherein:
said chamber is capable of movement between an open position where the object may be moved into and out of the chamber, and a closed position where the chamber is sealed in an air-tight manner.

11. The method of claim 3 wherein:
said sound waves comprise ultrasonic waves.

12. A system for non-invasive examination of an object comprised of cellulose material, said system comprising:
a chamber configured for movement between an open position where the object may be moved into and out of the chamber, and a closed position where the chamber is sealed;
one or more processors;
a signal generator in electronic communication with the processor and configured to generate sound waves within the chamber;
a signal detector in electronic communication with the processor and configured to detect sound waves within the chamber;
a heating device in electronic communication with the one or more processors and located within, or in fluid communication with, the chamber;
one or more temperature sensors in electronic communication with the one or more processors and located within, or in fluid communication with, the chamber;
one or more electronic storage devices in electronic communication with the one or more processors and comprising software instructions, which when executed, configure the one or more processors to:
take a first temperature reading of air within the chamber by way of the one or more temperature sensors;
take a first measurement of a speed of sound in the chamber by way of the signal generator and the signal detector;
generate heat within the chamber by way of the heating device;
take a second temperature reading of air within the chamber by way of the one or more temperature sensors;
take a second measurement of a speed of sound in the chamber by way of the signal generator and the signal detector;
determine an expected change in the speed of sound based on the first and second temperature readings;
determine an actual change in the speed of sound; and
determine that hidden chemicals are present where a difference between the actual change in the speed of sound and the expected change in the speed of sound is outside of a predetermined margin.

13. The system of claim 12 further comprising:
additional software instructions, which when executed, configure the one or more processors to determine that hidden chemicals are not present where the difference between the actual change in the speed of sound and the expected change in the speed of sound is within a predetermined margin.

14. The system of claim 12 wherein:
said signal generator comprises a first number of piezoelectric transducers located along a first side of the chamber;
said signal detector comprises a second number of piezoelectric transducers located along a second side of the chamber; and
the sound waves comprise ultrasonic sound waves.

15. The system of claim 14 further comprising:
additional software instructions, which when executed, configure the one or more processors to take the first and second measurements of the speed of sound in the chamber by determining the amount of time between transmitting sound waves from the first number of piezoelectric transducers and detecting sound waves at the second number of piezoelectric transducers.

16. The system of claim 12 further comprising:
additional software instructions, which when executed, configure the one or more processors to activate the heating element to generate heat until the temperature sensor indicates that a predetermined temperature is reached.

17. The system of claim 12 further comprising:
a database in electronic communication with the processor, said database comprising the expected speed of sound through air containing various compositions at various temperatures.

18. The system of claim 17 further comprising:
additional software instructions, which when executed, configure the one or more processors to query the database to retrieve a particular composition of air associated with a speed of sound most closely matching the second measurement.

19. The system of claim 18 further comprising:
a display in electronic communication with the one or more processors; and
additional software instructions, which when executed, configure the one or more processors to display the particular composition at the display.

20. A system for non-invasive examination of objects comprised of cellulose material, said system comprising:
a chamber configured for movement between an open position where a particular one of the objects may be inserted into and removed from the chamber, and a closed position where the chamber is sealed in an air-tight manner;
one or more processors;
a signal generator in electronic communication with the one or more processors;
a signal detector in electronic communication with the one or more processors;
a first number of piezoelectric transducers located along a first wall of the chamber, wherein each of said first number of piezoelectric transducers are in electronic communication with the signal generator, and wherein each of said first number of piezoelectric transducers are configured to generate ultrasonic sound waves;

a second number of piezoelectric transducers located along a second wall of the chamber opposing said first wall, wherein each of said second number of piezoelectric transducers are in electronic communication with the signal detector, and wherein each of said second number of piezoelectric transducers are configured to detect ultrasonic sound waves;

a heating device located within the chamber and in electronic communication with the one or more processors;

a temperature sensor located within the chamber and in electronic communication with the one or more processors;

a database in electronic communication with the one or more processors, said database comprising the expected speed of sound through various chemical compositions;

an electronic display in electronic communication with the one or more processors; and one or more electronic storage devices in electronic communication with the one or more processors and comprising software instructions, which when executed, configure the one or more processors to:
  take a first speed of sound measurement for the chamber by:
    instructing the first number of piezoelectric transducers to transmit a first burst of ultrasonic waves;
    determine, by way of the second number of piezoelectric transducers, that the first burst of ultrasonic waves has been detected;
    record a first elapsed time between the transmission and detection of the first burst of ultrasonic waves; and
    divide the first elapsed time by a known distance between the first and second number of piezoelectric transducers;
  activate the heating device to generate heat within the chamber;
  determine, by way of the temperature sensor, that the air in the chamber reaches a predetermined temperature;
  take a second speed of sound measurement for the chamber after determining that the air in the chamber reached the predetermined temperature by:
    instructing the first number of piezoelectric transducers to transmit a second burst of ultrasonic waves;
    determine, by way of the second number of piezoelectric transducers, that the second burst of ultrasonic waves has been detected;
    record a second elapsed time between the transmission and detection of the second burst of ultrasonic waves; and
    divide the second elapsed time by the known distance between the first and second number of piezoelectric transducers;
  determine an expected change in the speed of sound based upon the average composition of atmospheric air at the first temperature and the second temperature;
  determine an actual change in the speed of sound from the first and second speed of sound measurements;
  determine that at least one hidden chemical is present within the object where a difference between the actual change in the speed of sound and the expected change in the speed of sound is outside of a predetermined margin
  retrieve a chemical composition of air which most closely matches the second speed of sound measurement;
  remove, from the chemical composition of air, compounds found in average atmospheric air to identify a remaining compound; and
  display, at the electronic display, the remaining chemical compound as a hidden chemical within the object.

* * * * *